(12) United States Patent
Johnson et al.

(10) Patent No.: US 6,374,591 B1
(45) Date of Patent: Apr. 23, 2002

(54) LIQUIFIED NATURAL GAS (LNG) FUELED COMBINED CYCLE POWER PLANT AND A (LNG) FUELED GAS TURBINE PLANT

(75) Inventors: Paul C. Johnson, Boston; Edwin Toombs, Charlestown, both of MA (US)

(73) Assignee: Tractebel LNG North America LLC, Boston, MA (US)

( * ) Notice: Subject to any disclaimer, the term of this patent is extended or adjusted under 35 U.S.C. 154(b) by 0 days.

(21) Appl. No.: 08/903,576

(22) Filed: Jul. 31, 1997

Related U.S. Application Data

(63) Continuation of application No. 08/774,315, filed on Dec. 24, 1996, now abandoned, which is a continuation of application No. 08/456,605, filed on Jun. 1, 1995, now abandoned, which is a continuation-in-part of application No. 08/389,426, filed on Feb. 14, 1995, now Pat. No. 5,457,951.

(51) Int. Cl.[7] ............................................. F02C 7/143
(52) U.S. Cl. ....................................... 60/39.02; 60/728
(58) Field of Search ........................... 60/39.02, 39.182, 60/39.465, 728; 62/50.2, 50.3

(56) References Cited

U.S. PATENT DOCUMENTS

| 3,183,666 A | 5/1965 | Jackson |
|---|---|---|
| 3,726,085 A | 4/1973 | Arenson |
| 3,978,663 A | 9/1976 | Mandrin et al. |
| 4,036,028 A | 7/1977 | Mandrin |
| 4,330,998 A | 5/1982 | Nozawa |
| 4,422,298 A | 12/1983 | Nozawa |
| 4,429,536 A | 2/1984 | Nozawa |
| 4,953,479 A | 9/1990 | Keller et al. |
| 4,995,234 A | 2/1991 | Kooy et al. |
| 5,457,951 A | 10/1995 | Johnson et al. |

FOREIGN PATENT DOCUMENTS

| EP | 0009387 | 4/1980 |
|---|---|---|
| FR | 2399542 | 3/1979 |
| FR | 2416340 | 8/1979 |
| JP | 55148907 | 5/1979 |
| JP | 55160104 | 5/1979 |
| JP | 57122107 | 1/1981 |

OTHER PUBLICATIONS

Section 3.0 Description of the Project from the "Petition Before the Massachusetts Energy Facilities Council for Approval to Construct a Bulk Generating Facility Island End Congeneration Project", dated Mar. 1991, prepared by Cabot Power Corporation et al. and submitted by Cabot Power Corporation.

*Primary Examiner*—Louis J. Casaregola
(74) *Attorney, Agent, or Firm*—Kilyk & Bowersox, PLLC

(57) ABSTRACT

A process and system which improves the capacity and efficiency of a power plant. A LNG supply system fuels the plant. Gasified LNG in a combustor mixes with the air from an air compressor to provide the hot combustion gas for a gas turbine. The expanding LNG is used to chill a heat exchange fluid, e.g. water, which heat exchange fluid cools and densifies the intake air for the air compressor. Subsequently, the heat exchange fluid is used in another heat exchange step and is then re-chilled and recycled to cool and densify the intake air.

13 Claims, 3 Drawing Sheets

LIQUIFIED NATURAL GAS (LNG) FUELED COMBINED CYCLE POWER PLANT AND A (LNG) FUELED GAS TURBINE PLANT

CROSS-REFERENCE TO RELATED APPLICATIONS

This is a continuation Ser. No. 08/774,315 filed on Dec. 24, 1996 abandoned, which is a continuation of Ser. No. 08/456,605 filed Jun. 1, 1995 abandoned, which is a continuation-in-part of Ser. No. 08/389,426 filed Feb. 14, 1995, now U.S. Pat. No. 5,457,951.

FIELD OF THE INVENTION

The invention relates to the use of LNG in combination with a combined cycle plant (gas turbine plant/steam turbine plant) or a gas turbine plant. The LNG is regasified and chills a heat exchange fluid which fluid is used to cool and densify the intake air for a gas turbine. The heat exchange fluid is then used in one or more heat transfer steps. The regasified LNG is also used as fuel for the gas turbine and optionally for distribution to other power plants and natural gas distribution systems.

BACKGROUND AND BRIEF SUMMARY OF THE INVENTION

It is state of the art practice to extend a gas turbine plant with a waste-heat boiler and to combine the gas turbine plant with a steam turbine plant. The gas turbine and the steam turbine each drive their own generator or drive a single generator via a common shaft. These combination plants, referred to as combined cycle plants, are generally distinguished by their very good conversion efficiencies which range in the order of magnitude from 50 to 52%. These high efficiencies result from the cooperation of a gas turbine with at least one steam turbine plant. The gas turbine exhaust gases are passed through a waste-heat boiler and the residual heat potential of these waste-gases is utilized for producing the steam required for feeding the steam turbine. LNG has been used in combined cycle plants as a combustion energy source.

LNG is normally transported overseas as a cryogenic liquid in specialized vessels. At the receiving terminal this cryogenic liquid, which is approximately at atmospheric pressure and at a temperature of around −260° F., has to be regasified and fed to a distribution system at ambient temperature and at a suitably elevated pressure, typically ranging up to 80 atmospheres. The liquid is pumped to the required pressure so that when heat is added and it is regasified, no compression of the resultant natural gas is required.

Although many suggestions have been made and some installations have been built to utilize the large cold potential of the LNG, in most receiving terminals the cold potential is wasted and the LNG is simply heated with a large flow of sea water which has to be applied in such a manner as to avoid ice formation.

At a few terminals, the cold potential is utilized in air separation plants or similar cryogenic installations or for refrigeration purposes in the freezing and storing of foodstuffs. It has also been proposed to use the cold LNG as a heat sink in a power cycle to generate electrical energy. A number of possible cycles have been proposed which seek to overcome the difficulties caused by the large temperature difference through which the LNG is heated and the particular shape of the warming curve. However, it has been found that even with relatively simple cycles only a small part of the available cold potential can be utilized. Proposals to increase the efficiency employ more complex cycles involving a large number of turbines operating between different pressure levels.

U.S. Pat. No. 3,978,663 broadly discloses a method for improving the efficiency of gas turbines by cooling a stream of intake air with LNG. However, the process requires that coolants be mixed with the air to lower the freezing point of separated-out water.

U.S. Pat. No. 4,036,028 also discloses the use of LNG to cool the intake air of a gas turbine but again the coolant must be mixed with the air to prevent freezing of the separated-out water.

U.S. Pat. No. 4,995,234 discloses a power generation system which utilizes high pressure natural gas and high pressure high temperature carbon dioxide to drive turbines. To cool the intake air of a gas turbine, the intake air is placed in direct heat exchange relationship with the natural gas.

In our parent application, the invention broadly embodied a system and process which improved the capacity of a combined cycle plant in an amount up to 9% and the efficiency of the plant up to about 2%, particularly when the ambient temperature exceeded 60° F. A LNG fuel supply system was used in combination with the combined cycle plant. A primary heat exchange fluid was chilled, in a two step process, in the LNG fuel supply system and was then utilized in the gas turbine process to cool and densify the intake air to the gas turbine. The primary heat exchange fluid was also utilized in the steam turbine process to condense the spent stream from the steam turbine. Lastly, the primary heat exchange fluid was recycled to the LNG fuel supply system where it was rechilled. The primary heat exchange fluid flowed through a closed loop while cooling and densifying the intake air, while condensing the steam discharged from the steam turbine and when being rechilled in the LNG fuel supply system.

The present application discloses two further alternative embodiments of the invention(s) disclosed in our parent application with the same improvements in capacity 9% and efficiency 2%. The present application embodies the efficacious use of the thermal energy of LNG when the LNG is regasified. A heat exchange fluid is chilled, in a single step, in the LNG fuel supply system which chilled heat exchange fluid initially is used to cool and densify the intake air for a gas turbine. This heat exchange fluid is subsequently used in at least one other heat transfer step in a power generating process before it is recycled and rechilled by the expanding LNG. In one embodiment of the invention, the heat exchange fluid, after cooling and densifying the intake air, flows through a condenser associated with a steam turbine plant and is then subsequently rechilled. In another embodiment of the invention the heat exchange fluid, after cooling and densifying the intake air, flows through a heat recovery heat exchanger and is then subsequently rechilled.

More particularly, in one embodiment of the invention, the heat exchange fluid, a water/glycol mixture, flows through a regasifier/chiller (heat exchanger) in the LNG fuel supply system. This heat exchange fluid then flows through a heat exchanger in the gas turbine plant. The gas turbine plant, which is fueled by the gasified LNG, drives a generator. The gas turbine plant has an air intake duct, the heat exchanger, a water separator, an air compressor, a combustor, a gas turbine and an exhaust port. The heat exchanger is positioned within the air intake duct. The heat exchange fluid flows through the heat exchanger and supplies a chilled refrigerant stream for cooling and densifying the air intake stream which then flows into the air compressor.

A waste-heat boiler is downstream of and in communication with the exhaust port of the gas turbine. The exhaust of the gas turbine converts a stream of water flowing through the boiler into high pressure steam.

The steam turbine plant comprises a steam turbine and a condenser for spent steam. The high pressure steam from the boiler is used to drive the steam turbine. The spent steam from the turbine flows into a condenser. The heat exchange fluid flows through the condenser and condenses the spent steam. The heat exchange fluid then returns and flows through the regasifier/chiller in the LNG fuel supply system.

In the other embodiment of the invention, the heat exchange fluid, a water/glycol mixture, flows through the regasifier/chiller (heat exchanger) in the LNG fuel supply system. The LNG chills the heat exchange fluid which then flows through a heat exchanger in the gas turbine plant. The gas turbine plant, which is fueled by the gasified LNG, drives a generator. The gas turbine plant has an air intake duct, the heat exchanger, a water separator, an air compressor, a combustor, a gas turbine and an exhaust port. The heat exchanger is positioned within the air intake duct. The primary heat exchange fluid flows through the heat exchanger and supplies a chilled refrigerant stream for cooling and densifying the air intake stream to the air compressor.

A heat recovery heat exchanger is downstream of and in communication with the exhaust port of the gas turbine. The heat exchange fluid flows through the heat recovery heat exchanger. The heat exchange fluid then returns and flows through the regasifier/chiller in the LNG fuel supply system.

DESCRIPTION OF THE PREFERRED EMBODIMENT(s)

Figure 1:
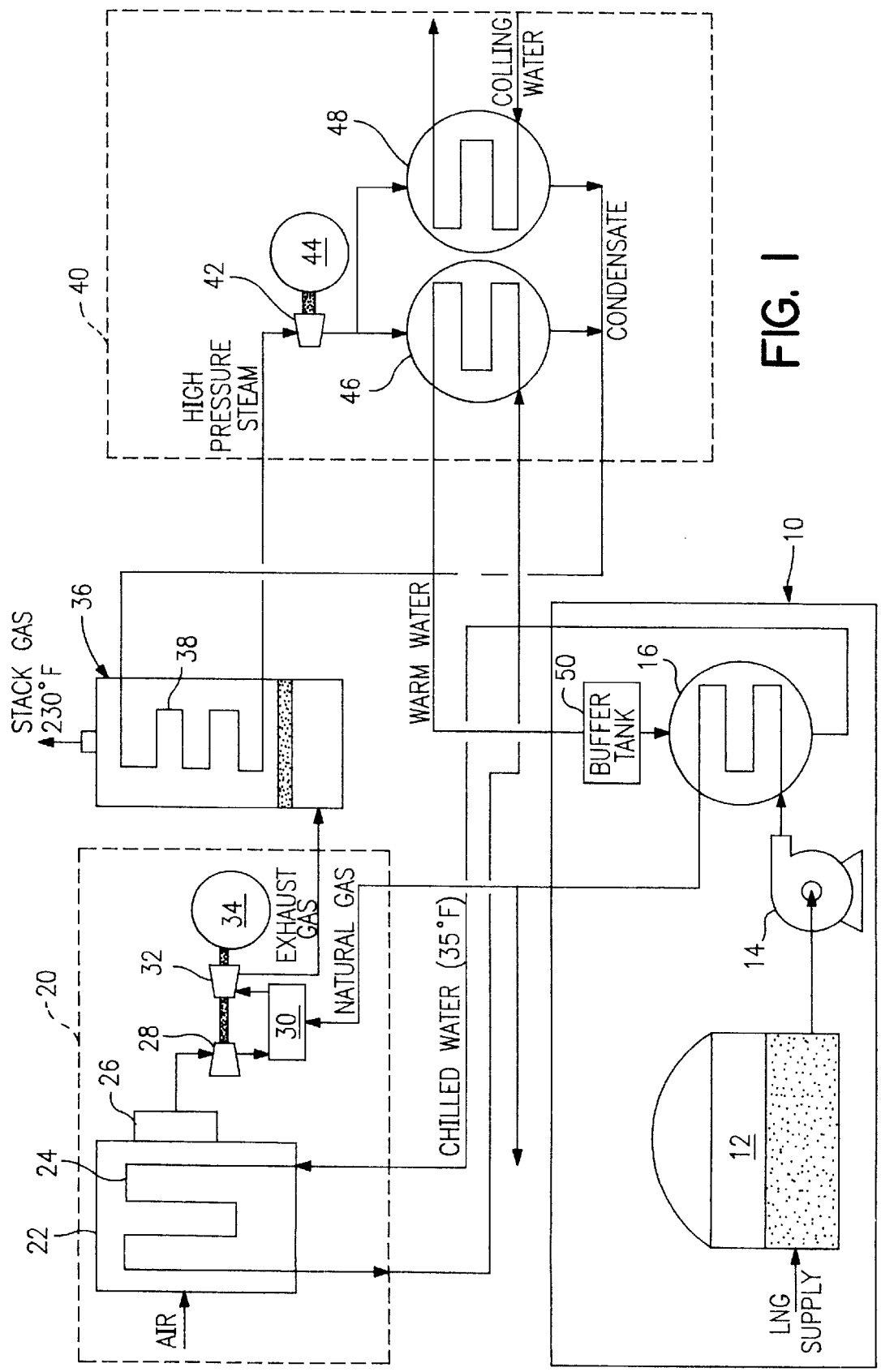
FIG. 1 is a process flow diagram of one system embodying the invention.

Referring to FIG. 1, a system of one embodiment of the invention comprises a liquefied natural gas (LNG) fuel supply system 10, and a combined cycle power station which comprises a gas turbine plant 20, a steam turbine plant 40 and a waste-heat boiler 36 interposed between the two plants. Circulating pumps for heat exchange fluids are not shown.

The LNG fuel supply system 10 comprises a supply tank 12, a pump 14 and a regasifier/chiller (heat exchanger) 16.

Natural gas from the regasifier/chiller 16 flows to the gas turbine plant 20 and to other power plants and/or to a natural gas distribution system. The gas turbine plant comprises an air intake duct 22, a heat exchanger 24 received therein and a downstream water and particulate filter 26 upstream of an air compressor 28.

Water from the regasifier/chiller 16 in the LNG fuel supply system 10 flows through the heat exchanger 24. The intake air flows across the heat exchanger 24 and is cooled and densified. The cooled densified air flows into the air compressor 28.

A combuster 30 receives the intake air from the air compressor 28, mixes it with the natural gas from the regasifier/chiller 16 and delivers the hot combustion gases to the gas turbine 32.

The combustion gases drive the gas turbine 32 and an associated generator 34. Preferably, the air compressor 28, gas turbine 32 and generator 34 are mounted on the same drive shaft.

The exhaust gas from the gas turbine 32 flows to the waste-heat boiler 36 where water flowing through a coil 38 is converted to high pressure steam.

The steam turbine plant 40 comprises a steam turbine 42 with an associated generator 44; both the steam turbine 42 and the generator 44 preferably being mounted on the same drive shaft. Alternatively, a larger single electric generator could be mounted on a common shaft with the gas turbine and steam turbine. Downstream of the turbine 42 is a condenser 46 through which the heat exchange fluid flows. In the event the LNG fuel supply system is off-line or is inadequate for the required cooling duty, an auxiliary condenser 48 is provided. The condenser 46 condenses the output (spent steam) from the steam turbine 42 which output is recycled back to the waste-heat boiler 36. The heat exchange fluid flows back to the regasifier/chiller 16 via a buffer tank 50.

The heat exchange fluid (warm water) flows into the buffer tank 50 which acts as a "fly-wheel", from which the heat exchange fluid is pumped to the regasifier/chiller 16. The fluid in the buffer tank can also be used in any other place where "low grade" heat, about 95° F., is required. Standby heaters (not shown) can be used to keep the fluid warm enough to provide the required heat if it is not available from the combined cycle plant.

If the LNG regasifier is not operating, the combined cycle plant can operate independently of the LNG regasifier by providing enough external cooling water to handle the entire condensing load. If the plants are not operating, the LNG regasifier can operate independently of the plants by providing external standby heaters for heating the circulating water.

Figure 2:
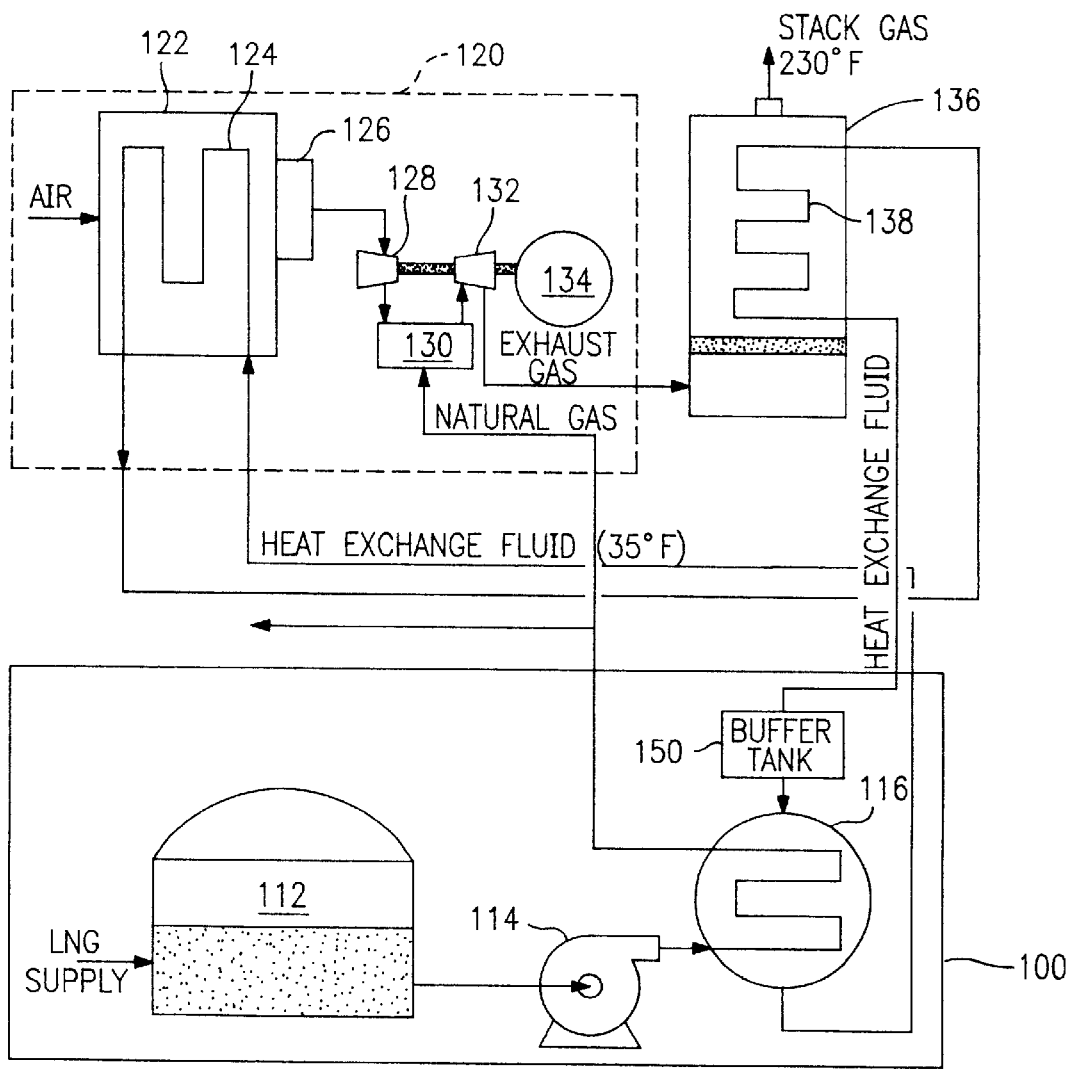
FIG. 2 is a process flow diagram of another system embodying the invention.

Referring to FIG. 2, a system of another embodiment of the invention is shown and comprises a liquefied natural gas (LNG) fuel supply system 100, a gas turbine plant 120, and a heat recovery heat exchanger 136 interposed between the gas turbine plant 120 and the fuel supply 100. Circulating pumps for heat exchange fluids are not shown.

The LNG fuel supply system 10 comprises a supply tank 112, a pump 114 and a regasifier/chiller 116.

Natural gas from the regasifier/chiller 116 flows to the gas turbine plant 120 and to other power plants and/or to a natural gas distribution system. The gas turbine plant comprises an air intake duct 122, a heat exchanger 124 received therein and a downstream water and particulate filter 126 upstream of an air compressor 128.

Water from the regasifier/chiller 116 in the LNG fuel supply system 100 flows through the heat exchanger 124. The intake air flows across the heat exchanger and is cooled and densified. The cooled densified air flows into the air compressor 128.

A combuster 130 receives the intake air from the air compressor 128, mixes it with the natural gas from the regasifier/chiller 116 and delivers the hot combustion gases to the gas turbine 132.

The combustion gases drive the gas turbine 132 and an associated generator 134. Preferably, the air compressor 128, gas turbine 132 and generator 134 are mounted on the same drive shaft.

The exhaust gas from the gas turbine 132 flows through the heat recovery heat exchanger 136. The heat exchange fluid flows from the heat exchanger 124, through a coil 138 and then into the regasifier/chiller 116 via a buffer tank 150.

The heat exchange fluid (warm water) flows into the buffer tank 150 which acts as a "fly-wheel", from which the heat exchange fluid is pumped to the regasifier/chiller 116. The fluid in the buffer tank 150 can also be used in any other place where "low grade" heat, about 95° F. or lower, is required. Standby heaters (not shown) can be used to keep the water warm enough to provide the required heat if it is not available from the heat recovery heat exchanger.

Figure 3:
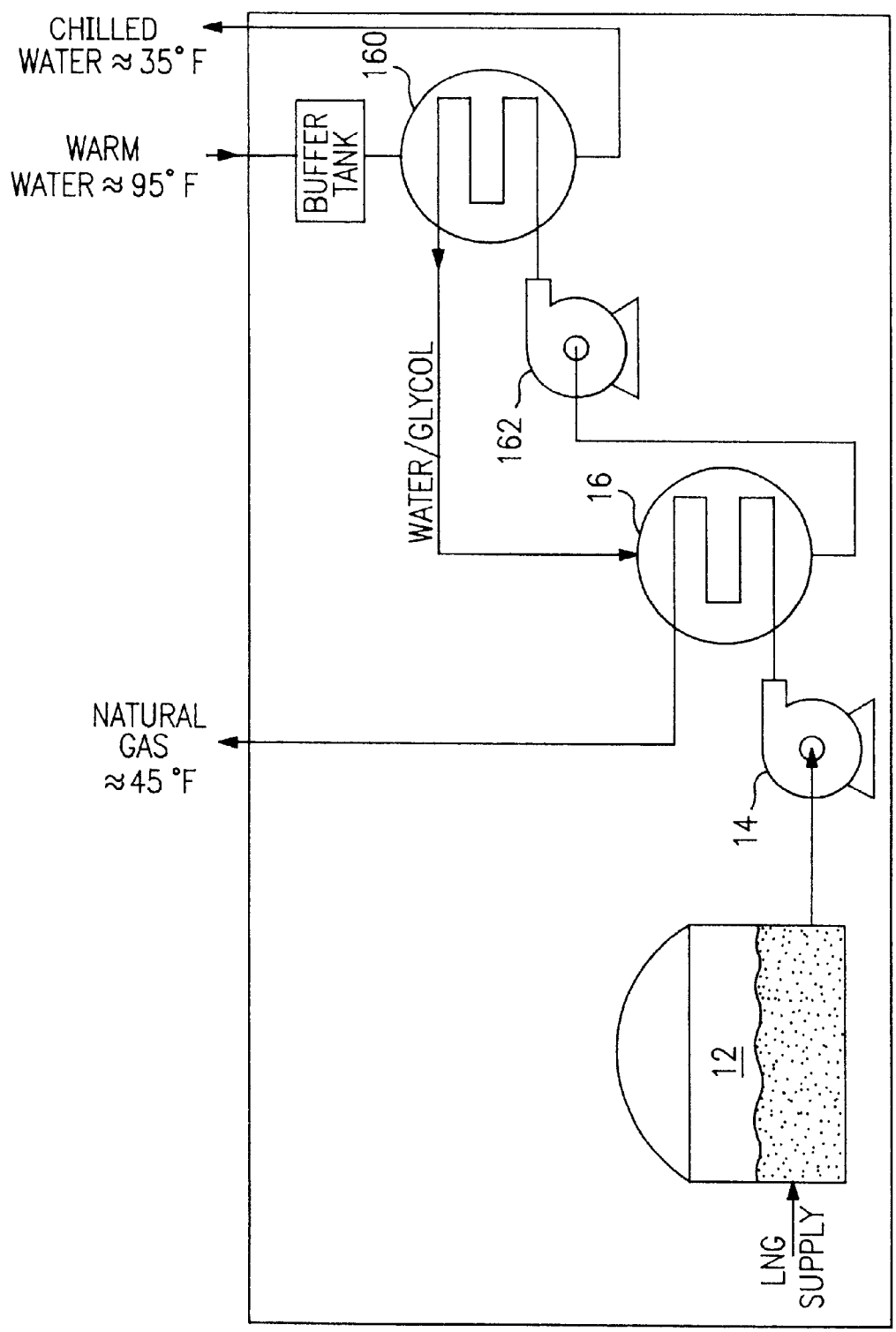
FIG. 3 is an illustration of a modified regasifier/chiller for the system of either FIG. 1 or FIG. 2.

Referring to FIG. 3, in an alternative embodiment of the systems shown in FIG. 1 and FIG. 2, the regasifier/chiller 16 (116) is modified for icing conditions on the heat exchange fluid side. This is particularly desirable where water and not a water/glycol mixture is used as the heat exchange fluid. Specifically, warm fluid at about 95° F. from the buffer tank 50 (150) flows through a heat exchanger 160, is chilled to about 35° F. and flows through the air intake duct 22 (122). A water/glycol mixture is pumped through the heat exchanger 160 and the regasifier/chiller 14 (114) in a closed loop, by a pump 162, to cool the warm fluid. The regasified LNG from the supply 12 (112) flows through the regasifier chiller 14 (114) and into the combuster 30 (130) at about 45° F.

For both embodiments of the invention, the flow of the heat exchange fluid is within a closed loop.

The heat, exchange fluid is preferably a water/glycol mixture to avoid the potential for freezing pure water in the LNG fuel supply system. The water/glycol ratio can vary between 4:1 to 1:1.

The heat exchange fluid which is used to regasify the LNG is chilled by the LNG to a low temperature, e.g. 35° F., and returned to the gas turbine plant to precool the turbine combustion air. If the ambient air is entering the air intake duct at a temperature of between 60° F. to 100° F. the energy and material balances of the systems of FIGS. 1 and 2 are controlled to reduce the temperature intake air to between about 40 to 60° F.

The regasifier/chillers (heat exchangers) in the LNG regasification systems are counter-current and use a minimum approach temperature of 25° F. The wall temperature at the cold end is somewhat below 32° F. and a thin layer of ice will reduce the transfer coefficient enough to raise the outside of the ice to 32° F.

The temperatures of the fluid streams for the LNG regasifier chiller where water/glycol is used would be as follows:

| | |
|---|---|
| water/glycol in | 95° F. |
| water/glycol out | 35° F. |
| LNG in | −260° F. |
| natural gas out | 45° F. |

The temperatures of the fluid streams for the LNG regasifier/ chiller where water is used would be as follows:

| | |
|---|---|
| water in | 95° F. |
| water out | 35° F. |
| LNG in | −260° F. |
| natural gas out | 45° F. |

The heat exchanger fluid temperature out of the regasifier/chillers is controlled by modulating a control valve (not shown) on the outlet stream thereby reducing the fluid flow rate as the available refrigeration decreases, i.e. the LNG flow rate decreases.

The heat exchange fluid which is chilled in the regasifier/chiller is used primarily for precooling the combustion air for the gas turbine. The chilled fluid can also be used for various plant cooling duties, including any place where "low grade" refrigeration, e.g. 35° F. or higher, is required.

The LNG fuel supply system can provide large quantities of refrigeration for the plants cooling as well as for internal cooling. Conversely the plants can provide large quantities of heat to the LNG fuel supply system with no decrease in the plants performance. The heat exchanger fluid circulating between the plants and the LNG fuel supply system makes this possible.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

What is now claimed is:

1. A method for enhancing the capacity and efficiency of a gas turbine plant which comprises:

flowing LNG into a regasifier/chiller;

flowing a heat exchange fluid into the regasifier/chiller to regasify the LNG and to chill the heat exchange fluid;

flowing the chilled heat exchange fluid through a heat exchange zone through which zone flows the intake air for an air compressor in the gas turbine plant, the heat exchange fluid cooling and densifying the intake air;

flowing the heat exchange fluid from the heat exchange zone through a heat recovery heat exchanger to warm the heat exchange fluid;

flowing the heat exchange fluid from the heat recovery heat exchanger back to the regasifier/chiller;

flowing the regasified LNG to a combuster in the gas turbine plant;

mixing the cooled densified air with the regasified LNG in the combuster to generate hot combustion gases;

flowing the hot combustion gases to a turbine in the gas turbine plant to drive the turbine; and discharging hot exhaust gases from the turbine and flowing the hot exhaust gase, without heat exchange, directly to said heat recovery heat exchanger.

2. The method of claim 1 which comprises:

placing the heat exchange fluid in indirect heat exchange relationship with the intake air.

3. The method of claim 1 wherein the heat exchange fluid is a water/glycol mixture.

4. A method for enhancing the capacity and efficiency of a gas turbine plant which comprises:

flowing LNG into a regasifier/chiller;

flowing a heat exchange fluid into the regasifier/chiller to regasify the LNG and to chill the heat exchange fluid;

flowing the chilled heat exchange fluid through a heat exchange zone through which zone flows the intake air for an air compressor in the gas turbine plant, the heat exchange fluid cooling and densifying the intake air;

flowing the heat exchange fluid from the heat exchange zone through a heat recovery heat exchanger to warm the heat exchange fluid;

flowing the heat exchange fluid from the heat recovery heat exchanger back to the regasifier/chiller;

flowing the regasified LNG to a combuster in the gas turbine plant;

mixing the cooled densified air with the regasified LNG in the combuster to generate hot combustion gases;

flowing the hot combustion gases to a turbine in the gas turbine plant to drive the turbine; and discharging hot exhaust gas from the turbine and flowing the hot exhaust gases to said heat recovery heat exchanger, wherein the heat exchange fluid is a water/glycol mixture and the temperature of the water/glycol mixture entering the regasifier/chiller is approximately 95° F., the temperature of the water/glycol mixture exiting the regasifier/chiller is about 35° F. and the regasified LNG exiting the regasifier/chiller is about 45° F.

5. The method of claim 4 which comprises:

improving the capacity of the combined cycle plant in an amount of up to 9%.

6. The method of claim 4 which comprises:

increasing the efficiency of the combined cycle plant up to about 2%.

7. A LNG combined cycle plant which comprises:

a LNG fuel supply system which system includes:
  a source of LNG;
  a regasifier/chiller for the LNG in fluid flow communication with the source of LNG;

a gas turbine plant which comprises:
  an air compressor;
  an air intake duct upstream of said air compressor;
  a heat exchanger disposed in heat exchange relationship with the air intake duct;
  a gas turbine;
  a combuster interposed between the air compressor and the gas turbine, the combuster providing the energy to drive the gas turbine;
  a generator coupled to the gas turbine; and
  means to exhaust the gas from the gas turbine;

a heat recovery heat exchanger downstream of the gas turbine;

means to flow the exhaust gas from the gas turbine, without heat exchange, directly into the heat recovery heat exchanger;

means to flow a heat exchange fluid through the system in a single continuous flow path which comprises:
  means to flow the heat exchange fluid through the regasifier/chiller to chill the heat exchange fluid;
  means to flow the heat exchange fluid from the regasifier/chiller and through the heat exchanger in the air intake duct to cool and densify the intake air flowing through the air duct and into the compressor;
  means to flow the heat exchange fluid from the heat exchanger and through the heat recovery heat exchanger to warm the heat exchanger fluid; and
  means to flow the heat exchange fluid from the heat recovery heat exchanger and through the regasifier/chiller.

8. The plant of claim 7 which includes:

means to place the heat exchange fluid in indirect heat transfer relationship with the intake air.

9. A LNG combined cycle plant which comprises:

a LNG fuel supply system which system includes:
  a source of LNG;
  a regasifier/chiller for the LNG in fluid flow communication with the source of LNG;

a gas turbine plant which comprises:
  an air compressor;
  an air intake duct upstream of said air compressor;
  a heat exchanger disposed in heat exchange relationship with the air intake duct;
  a gas turbine;
  a combuster interposed between the air compressor and the gas turbine, the combuster providing the energy to drive the gas turbine;
  a generator coupled to the gas turbine; and
  means to exhaust the gas from the gas turbine;

a heat recovery heat exchanger downstream of the gas turbine;

means to flow the exhaust gas from the gas turbine into the heat recovery heat exchanger;

means to flow a heat exchange fluid through the system in a single continuous flow path which comprises:
  means to flow the heat exchange fluid through the regasifier/chiller to chill the heat exchange fluid;
  means to flow the heat exchange fluid from the regasifier/chiller and through the heat exchanger in the air intake duct to cool and densify the intake air flowing through the air duct and into the compressor;
  means to flow the heat exchange fluid from the heat exchanger and through the heat recovery heat exchanger to warm the heat exchanger fluid;
  means to flow the heat exchange fluid from the heat recovery heat exchanger and through the regasifier/chiller; and wherein the heat exchange fluid is a primary heat exchange fluid wherein the gasifier/chiller is a first regasifier/chiller which comprises:

means for flowing a secondary heat exchange fluid between a second regasifier/chiller and the first regasifier chiller, the first and second regasifier/chillers in fluid flow and heat transfer relationship with one another, to cool the primary heat exchange fluid.

10. The plant of claim 9 wherein the secondary heat exchange fluid is a water/glycol mixture.

11. The plant of claim 9 which comprises:

means for flowing the secondary heat exchange fluid between the first and second regasifier/chillers in a closed loop.

12. A method for enhancing the capacity and efficiency of a gas turbine plant which comprises:

flowing LNG into a regasifier/chiller;

flowing a heat exchange fluid into the regasifier/chiller to regasify the LNG and to chill the heat exchange fluid;

flowing the chilled heat exchange fluid through a heat exchange zone through which zone flows the intake air for an air compressor in the gas turbine plant, the heat exchange fluid cooling and densifying the intake air;

flowing the heat exchange fluid from the heat exchange zone through a heat recovery heat exchanger to warm the heat exchange fluid;

flowing the heat exchange fluid from the heat recovery heat exchanger back to the regasifier/chiller;

flowing the regasified LNG to a combuster in the gas turbine plant;

mixing the cooled densified air with the regasified LNG in the combuster to generate hot combustion gases;

flowing the hot combustion gases to a turbine in the gas turbine plant to drive the turbine; and discharging hot exhaust gases from the turbine and flowing the hot exhaust gases to said heat recovery heat exchanger, wherein the heat exchange fluid remains in a liquid phase throughout the flow of heat exchange fluid into the regasifier/chiller, through the heat exchange zone, from the heat exchange zone through the heat recovery heat exchanger, and from the heat recovery heat exchanger back to the regasifier/chiller.

13. A LNG combined cycle plant that comprises:

a LNG fuel supply system which system includes:
   a source of LNG;
   a regasifier/chiller for the LNG in fluid flow communication with the source of LNG;

a gas turbine plant which comprises:
   an air compressor;
   an air intake duct upstream of said air compressor;
   a heat exchanger disposed in heat exchange relationship with the air intake duct;
   a gas turbine;
   a combuster interposed between the air compressor and the gas turbine, the combuster providing the energy to drive the gas turbine;
   a generator coupled to the gas turbine; and
   means to exhaust the gas from the gas turbine;

a heat recovery heat exchanger downstream of the gas turbine;

means to flow the exhaust gas from the gas turbine into the heat recovery heat exchanger;

means to flow a heat exchange fluid in a liquid phase through the system in a single continuous flow path which comprises:
   means to flow the heat exchange fluid through the regasifier/chiller to chill the heat exchange fluid;
   means to flow the heat exchange fluid from the regasifier/chiller and through the heat exchanger in the air intake duct to cool and density the intake air flowing through the air duct and into the compressor;
   means to flow the heat exchange fluid from the heat exchanger and through the heat recovery heat exchanger to warm the heat exchanger fluid; and
   means to flow the heat exchange fluid from the heat recovery heat exchanger and through the regasifier/chiller.

\* \* \* \* \*

UNITED STATES PATENT AND TRADEMARK OFFICE
CERTIFICATE OF CORRECTION

PATENT NO.   : 6,374,591 B1
DATED        : April 23, 2002
INVENTOR(S)  : Johnson et al.

It is certified that error appears in the above-identified patent and that said Letters Patent is hereby corrected as shown below:

Title page,
Item [75], Inventors, "Edwin Toombs" should read -- A. Edwin Toombs --.

Column 6,
Line 48, "gase" should read -- gases --.

Column 7,
Line 9, "gas", should read -- gases --.

Signed and Sealed this

Twenty-third Day of July, 2002

Attest:

JAMES E. ROGAN
Attesting Officer                 Director of the United States Patent and Trademark Office

UNITED STATES PATENT AND TRADEMARK OFFICE
CERTIFICATE OF CORRECTION

PATENT NO. : 6,374,591 B1 Page 1 of 1
DATED : April 23, 2002
INVENTOR(S) : Johnson et al.

It is certified that error appears in the above-identified patent and that said Letters Patent is hereby corrected as shown below:

<u>Title page, Item [54] and Column 1, line 1,</u>
"LIQUIFIED", should read -- LIQUEFIED --.

<u>Drawings,</u>
Sheet 1 of 3, Fig. 1, "COLLING", should read -- COOLING --.

Signed and Sealed this

Twenty-ninth Day of April, 2003

JAMES E. ROGAN
*Director of the United States Patent and Trademark Office*